(Model.)
J. W. GILBERT.
DENTAL ENGINE HAND PIECE.
No. 287,761. Patented Oct. 30, 1883.
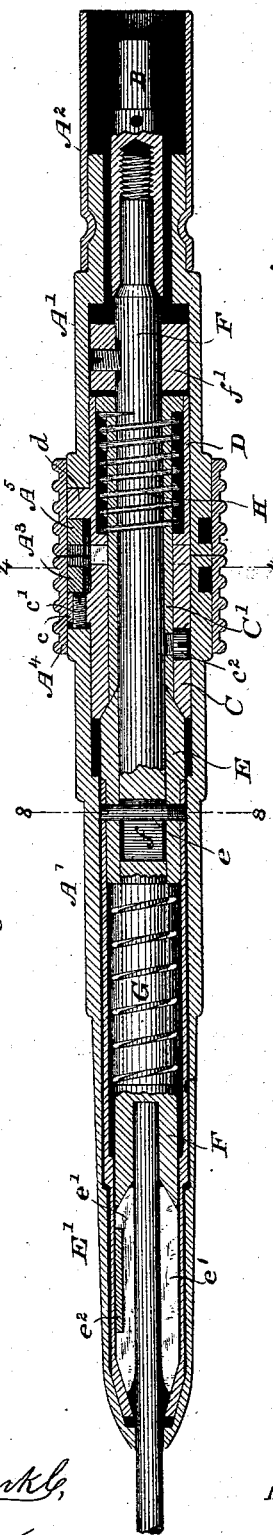
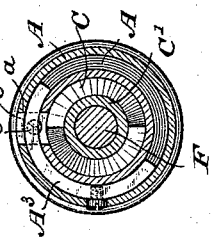
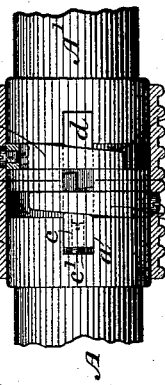
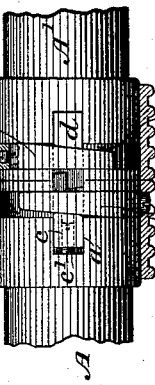
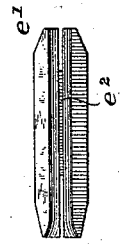
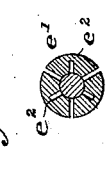
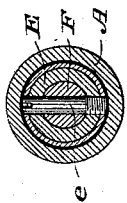
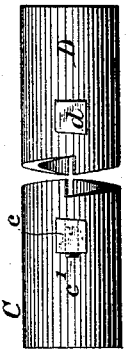
WITNESSES:
Wm A. Skinkle
Wm Musser
INVENTOR:
John W. Gilbert,
By his Attorneys
Baldwin, Hopkins & Peyton

UNITED STATES PATENT OFFICE.

JOHN W. GILBERT, OF PHILADELPHIA, PENNSYLVANIA, ASSIGNOR TO THE S. S. WHITE DENTAL MANUFACTURING COMPANY, OF SAME PLACE.

DENTAL-ENGINE HAND-PIECE.

SPECIFICATION forming part of Letters Patent No. 287,761, dated October 30, 1883.

Application filed March 27, 1883. (Model.)

*To all whom it may concern:*

Be it known that I, JOHN W. GILBERT, of the city and county of Philadelphia, in the State of Pennsylvania, have invented certain new and useful Improvements in Hand-Pieces or Tool-Carriers, more especially useful in connection with dental engines, of which the following is a specification.

My invention relates to hand-pieces or tool-carriers, more particularly useful with surgical and dental engines, for carrying and driving the operating tools or instruments. My hand-piece belongs, more particularly, to the class known as "chuck hand-pieces"—that is, to hand-pieces in the rotary spindle or tool-chuck—of which the shank of the operating-tool is locked by split or spring jaws acting laterally upon the tool-shank, whereby the tools are locked in the socket of the rotary chuck or spindle by friction, and without the employment of devices to engage notches, recesses, or lugs on the tool-shank. As dental operating-tools for dental engines as now manufactured have cylindrical shanks of about the same size, it will be seen that any of the tools may be locked in the chuck-socket, irrespective of the particular formation of the driving end of the shank.

The object of my invention, more especially, is to provide an improved form of chuck hand-piece, in which the tool may be readily inserted and removed and securely clamped when in operation, the hand-piece permitting of ready adjustment to take up wear, and the clamping and releasing actions of the chuck being effected by turning one section of the casing relatively to the other.

My improvements are illustrated in the accompanying drawings as embodied in the best way now known to me. I wish it distinctly understood, however, that some of my improvements may be used without the others, and in hand-pieces differing from that particularly shown in said drawings, the subject-matter claimed by me being particularly recited at the close of this specification.

In said drawings, Figure 1 is a longitudinal central section through a hand-piece embodying my improvements. Fig. 2 is a plan and partially sectional view of the connections by which the tool-locking mechanism is operated, and by which the casing-sections are secured together, while permitting of their ready separation when necessary. Fig. 3 is a view of the cam-sleeves by which the locking-jaws are controlled, and Fig. 4 is a transverse section, through the hand-piece, on the line 4 4 of Fig. 1. Fig. 5 is a view in elevation of one of the longitudinal sections of one form of clamping-jaws devised by me. Fig. 6 is a view of said clamping-jaw tool-lock detached, and illustrated as surrounding a tool-shank, and Fig. 7 is a transverse section therethrough on the line 7 7 of Fig. 6. Fig. 8 is a transverse section through the hand-piece on the line 8 8 of Fig. 1, and Fig. 9 is a view in elevation of a modified form of my improved sectional spring clamping-jaw tool-locking device.

The hand-piece casing is shown in this illustration as consisting of a handle-section, A, an intermediate section, A', and a shank-section, A², connected to said intermediate section by a swivel-joint in well-known ways, whereby the handle-section, in operation, may conform to the turning movements of the hand of the operator when the shank-section is firmly connected to the outer end of the usual flexible sheath, which surrounds the usual flexible driving-shaft of the dental engine, the outer end of said driving-shaft itself being firmly connected with the butt-end of the tool-carrying spindle or chuck of the hand-piece, or a connection thereof, so as to rapidly revolve said chuck or spindle upon its longitudinal axis in the casing to give motion to the operating-tool, which it carries.

I have omitted showing in the drawings either the flexible driving-shaft, or the flexible enveloping-sheath thereof, as they are of well-known construction, preferably like those of the well-known S. S. White dental engine, in common use, or as patented to Nelson Stow in his Patent No. 8,607, of March 4, 1879. I have shown, however, a socketed cone-mouth screw-coupling, B, as a suitable connection between the spindle-chuck or tool-holder and the flexible driving-shaft. I do not claim this particular connection, as it is not of my sole invention, being claimed by me, in connection with others, in a separate application.

The casing-sections A A' are connected by means of union pieces or sleeves C D, the adjacent faces of which are cam-surfaces, as clearly shown in Figs. 1, 2, and 3. The front end of the coupling-sleeve C has a smooth cylindrical periphery, upon which the rear end of the handle-section A of the casing is slipped and snugly fitted, the handle-section being provided with a longitudinal slot, $a$, adapted to receive a lug, $c$, projecting from the sleeve C, and carrying a set-screw, $c'$, as clearly shown in Figs. 1, 2, and 3, to limit the extent of movement of the casing-section upon the front end of the coupling-sleeve. The handle-section of the casing is locked upon the front end of the coupling-sleeve C, as against endwise movement, by means of a slide piece or lug, $A^3$, fitted in an annular groove in said handle-section, and controlled, preferably, by a ring, $A^4$, surrounding the casing-section, and fitted to turn thereon to carry the slide-piece, with which the ring is connected, by a screw, for instance, behind the aforesaid lug $c$ of the coupling C, as shown in Figs. 1 and 2, whereby it will be understood that until the slide-piece is withdrawn the handle-section of the casing and coupling-sleeve C are securely locked together, while they may be readily separated by the mere adjustment or withdrawal of the slide-piece from the path of the lug $c$. It will be noticed that the front edge of the slide piece or lug $A^3$ is beveled or cammed to slide against the correspondingly-shaped rear side of the lug $c$. Compensation for adjustment and wear is thus provided for, and all loose movement is avoided. The bore of the coupling-sleeve C is fitted with a tubular bushing, $C'$, the coupling and bushing being securely locked together, by means of a set-screw, $c^2$, for instance. The front end of the coupling-piece has a cone-shaped or tapered mouth, and this cone-socket forms a cone-bearing for the coned rear end of the hollow spindle or chuck E of the hand-piece. This hollow spindle is composed of two sections united together by a transverse screw or pin, $e$, as clearly shown in Figs. 1 and 8; and the hollow spindle is also provided at its front end with a cone-journal snugly fitting a corresponding seat or bearing at the front end of the handle-section of the casing. It will thus be seen that the hollow tool-carrying spindle is provided with cone-bearings, whereby the spindle is caused to run true and steadily, while any wear that may occur to journals or bearings may be readily compensated for and taken up by adjusting the handle-section of the casing upon the coupling C, as regulated by the adjusting-screw $c'$, above described. This adjusting-screw method of compensating for wear is not broadly claimed by me herein, as, broadly, it is the joint invention of myself and others, for which an application is now pending.

Contained within the hollow spindle is the tool-locking mechanism $E'$ of the hand-piece. This tool-locking mechanism is of the chuck order, and preferably consists of separable longitudinal clamping-sections $c'$—three in number, for instance—which, when united together, form a longitudinal socket for the reception of the tool-shank. Each of these longitudinal sections $c'$ may consist of two members united together by a connecting web or strip, $e^2$, extending only part of the length of the clamping-sections, as clearly shown in Figs. 1, 5, 6, and 7. Each section is preferably made of one piece of spring metal—such as steel, for instance. The front and rear ends of the spring-clamp or chuck tool-lock thus formed are coned or tapered. The front coned end of the longitudinally-sectional clamp tool-lock is fitted to a corresponding internal seat at the front end of the hollow spindle or chuck E, while the rear end of said sectional clamp tool-lock is tapered or coned to fit in the corresponding mouth of a socket formed in a spindle-rod, F, when said rod is moved forward in the hollow spindle. When said rod is moved forward, its tapered mouth, acting upon the rear end of the sectional clamp tool-locking device, contracts that end of the clamp, and consequently the tool-socket thereof, while the front end of said clamp is also contracted by being forced into its tapered seat in the spindle. If a tool of the proper size is inserted in the clamp-locking device, the clamp, when contracted, will clamp the tool-shank firmly and lock it in the clamp by lateral pressure or friction, and the clamp itself will also be locked in the spindle by friction at its front and rear ends, so as to keep it from turning independently of said spindle, and cause it to be rigidly driven therewith. When the spindle-rod F is retracted or moved away from or loosened upon the rear end of the clamp-lock, it will be obvious that the members or jaws of the clamp will tend to resume their loose position or separate slightly, and thus the tool-shank will be released and may be readily removed and be replaced, or a new tool be readily inserted in the spindle tool-holder to be driven. The locking spindle-rod F is normally thrust forward to compress the members or jaws of the clamp and contract its tool-receiving socket by means of a strong spring, G, which surrounds said rod, and is compressed between the front end of the rear spindle-section and an annular shoulder formed upon the locking-rod, as clearly shown in Fig. 1. It will thus be understood that owing to the action of the spring G the normal condition of the clamp-lock is a compressed, contracted, or locking condition, and therefore to release said clamp the locking-rod has to be withdrawn or moved back to permit the members or jaws to expand, as above described. The locking spindle-rod F is of course passed at its front end into the hollow chuck-spindle. As this rod also constitutes part of the driving-connection of the rotary spindle, it is connected with such spindle, preferably by means of the transverse pin $e$, which, owing to the longitudinal slot $f$ in the rod, permits said rod to be moved endwise relatively to the spindle, which turns in fixed bearings, while, as against rotary or torsional strain, the rod and spindle are firmly connected together. The locking and driving spindle-rod F passes through the tubular bushing C' of the coupling-sleeve C, above mentioned, and a short distance in rear of said bushing is provided with a preferably adjustable collar, $f'$, which, however, should be fixed upon the rod in the operation of the hand-piece. This collar constitutes a shoulder by which the locking and driving rod may be retracted in order to permit the tool to be inserted or withdrawn. This endwise movement of the locking-rod is accomplished by the rotation of the cammed coupling-sleeve D, before mentioned, upon the bushing C', which it surrounds, the sleeve D being firmly but detachably united with the casing-section A', preferably by means of a lug, $d$, projecting from the sleeve D, which fits a longitudinal slot in said casing-section A', and is locked therein by a sliding piece or lug, $A^5$, controlled from the outside of the casing, in a manner similar to that before described in connection with the coupling C and handle-section of the casing.

Contained within the coupling-sleeve D, and surrounding the rear end of the bushing C', and compressed between an annular enlargement at the rear end of the bushing and an annular shoulder at the front end of the sleeve D, is a coiled spring, H, the tendency of which is to keep the cammed or adjacent faces of the coupling-sleeves C and D in close contact, and in the position of their nearest approach, and consequently, also, it tends to keep the casing-sections A A' in close contact at their joints. When, however, the tool-lock is to be operated, the casing-section A' is turned relatively to the handle-section A, consequently turning the coupling-sleeve D relatively to the sleeve C, and, owing to the cammed faces of said couplings, moving the coupling D backward upon the bushing C', against, of course, the tension of the spring H. The rear end of the sleeve D by this movement comes in contact with the fixed collar $f$ of the locking-rod F, and moves said locking-rod backward a limited distance. This endwise movement of the locking-rod F is slight, but sufficient to withdraw its front cupped end from contact with the rear end of the sectional clamp, so as to enable said clamp to expand to release the tool, as before described. After a tool has been inserted in the clamp and it is to be locked, the sections of said clamp are brought together or contracted by a reverse movement of the rod F to that necessary to release the tool, whereupon the couplings C and D will approach each other, while the rod F will be thrust forward by its spring G to contract the clamping device.

It will be obvious that, owing to the construction of the coupling-sleeves C and D and the casing-sections A A', with their sliding locking pieces or lugs, the casing-sections may be separated almost instantaneously to expose the internal parts of the hand-piece to admit of cleansing or repair.

As a modification of my improved clamp tool-locking device made up of longitudinal sections, I have devised the form shown in Fig. 9. This consists of spiral spring sections with their ends tapered as in the form first described. The several sections of the spiral spring clamp lock, when fitted together, form a socket through the clamp for the passage of the tool-shank, as in the form first described.

I am aware of the spring-clamp locking devices patented to Reiley in 1875, and to Rehfuss, March 14, 1882. Reiley's clamping device is made in one piece, with the ends of the clamp split, while Rehfuss also has the split-end spring-clamp made in cross-sections, or, rather, in two pieces. The serious defect in this form of clamp is that its action is limited to the extent of movement of the split ends of the clamp, and the tool is only grasped at the free ends of the clamp when compressed, and at the extreme ends or mouths only, and when the tool-shank is small or fails to snugly fit the bore of the clamp the clamp will not hold it firmly. On the contrary, in my cone end longitudinally-sectioned clamp the sections are stiffer and stronger, and are free to be carried or compressed together, or opened to a practically unlimited extent, depending only on the length and taper of the cone ends; hence my clamp has greater capacity and is much superior, the tool being clamped thereby, not only at the ends of the clamp-sections, but along their entire length, whereby the tool is firmly grasped and held.

Without elaborating the simplicity, capabilities, and advantages of a hand-piece constructed according to my invention, I will state the subject-matter claimed by me herein to be as follows:

1. The combination, substantially as hereinbefore set forth, of a section of a hand-piece casing, a union-piece or coupling-sleeve, with which said section is connected, having a lug or shoulder thereon fitted to enter a slot in said section, and a slide-piece or lug carried by said section, whereby said section and the coupling may be securely fastened together with the capacity of being readily separated.

2. The combination of a section of a hand-piece casing, a union-piece or coupling-sleeve, with which said section is connected, having a lug thereon fitted to enter a slot in said section, and a slide-piece carried by said section, having a compensating or cam surface to act upon the lug of said coupling.

3. The combination of the handle-section of the casing and the coupling-sleeve thereof with another casing-section and its coupling-sleeve, said coupling-sleeves being united together by a yielding connection, substantially as described.

4. The combination of the handle-section of the casing and the coupling-sleeve thereof with another casing-section and its coupling-sleeve, said coupling-sleeves being connected together by a turning spring-connection, substantially as described.

5. The combination of the tubular union pieces or couplings, the bushing connecting said couplings, and the spring acting to keep said couplings close together, substantially as described.

6. The tubular union pieces or couplings having cam-faces to work against each other, in combination with a spring to keep said cam-faces in close contact, substantially as described.

7. A cylindrical tubular coupling or union-piece provided on its periphery with a lug, and on one of its ends with a cam-face, as an article of manufacture.

8. The combination, substantially as hereinbefore set forth, of a casing, a hollow spindle fitted to turn in said casing, said spindle being composed of two tubular sections rigidly united by a transverse pin or connection, and containing a tool-locking mechanism, and a driving and tool-lock operating-rod passing into said spindle from the rear, and provided with a longitudinal slot, through which a fixed cross-pin of the spindle passes, whereby the spindle is readily put together and rigidly driven, while the driving-rod is free to be moved endwise to operate the tool-lock.

9. The combination of the casing, the hollow spindle, fitted to turn in bearings therein, a spring-clamp device contained within said spindle, having tapered or cone surfaces at each end, an endwise-movable rod to compress the members of said clamp, cam mechanism to move said rod endwise, and turning casing-sections to operate said cam mechanism, substantially as described.

10. The compressible clamp-locking device for tool-carriers, consisting of separable longitudinal sections having tapered or cone ends, whereby the sections of the clamps may be compressed together, substantially as described.

In testimony whereof I have hereunto subscribed my name this 21st day of March, A. D. 1883.

JOHN W. GILBERT.

Witnesses:
WILLIAM H. GILBERT,
ELI T. STARR.